June 18, 1946.　　W. A. GANTNER　　2,402,389
BRAKE RIGGING
Filed March 24, 1945　　3 Sheets-Sheet 2
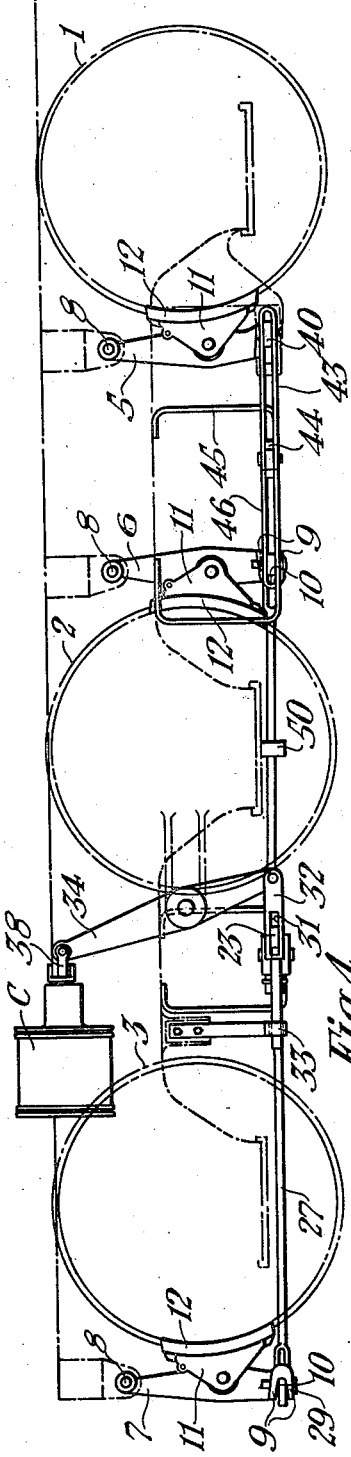
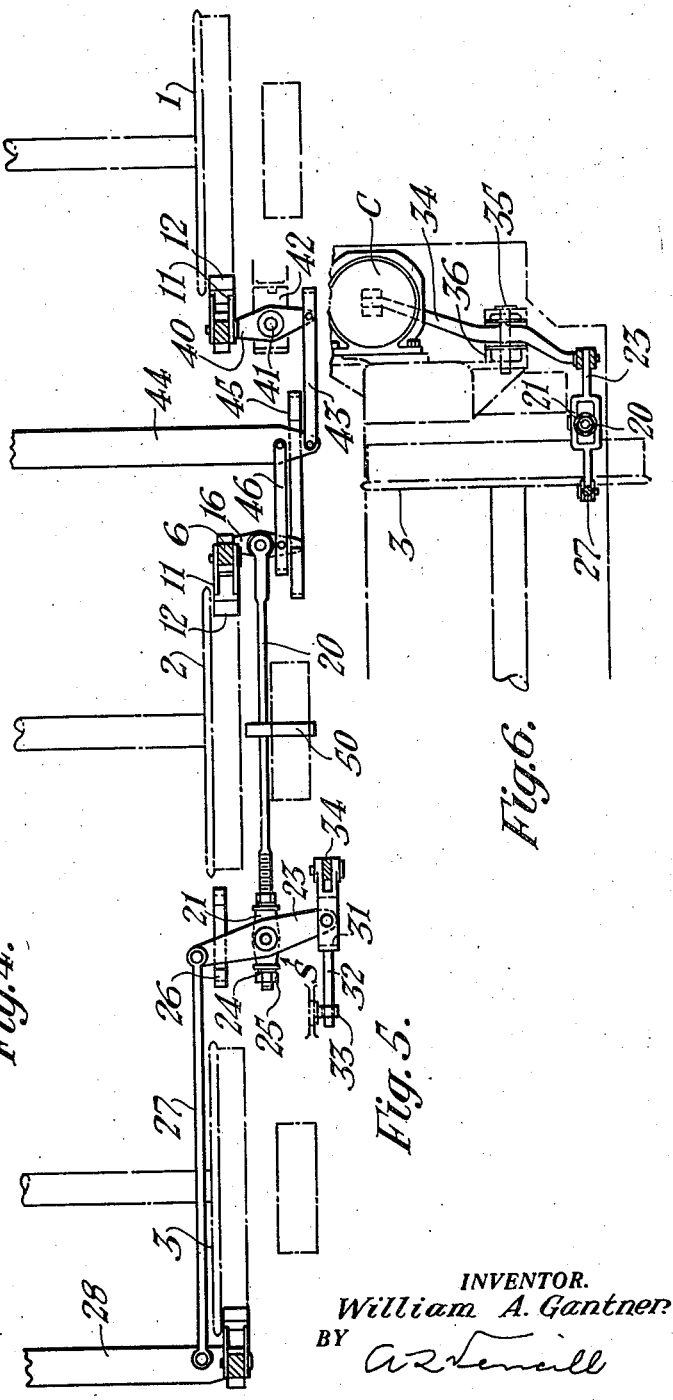
INVENTOR.
William A. Gantner
BY
HIS ATTORNEY

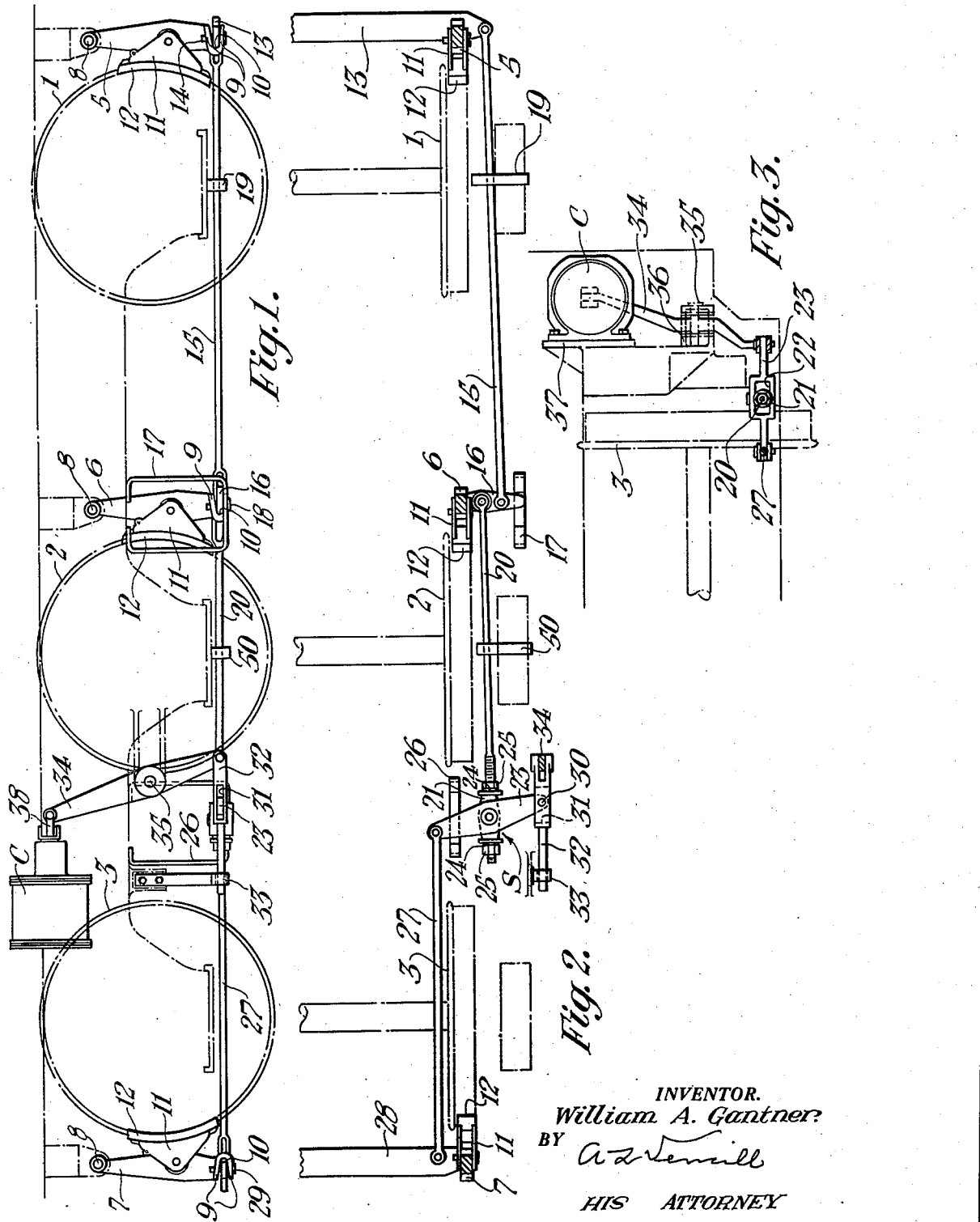

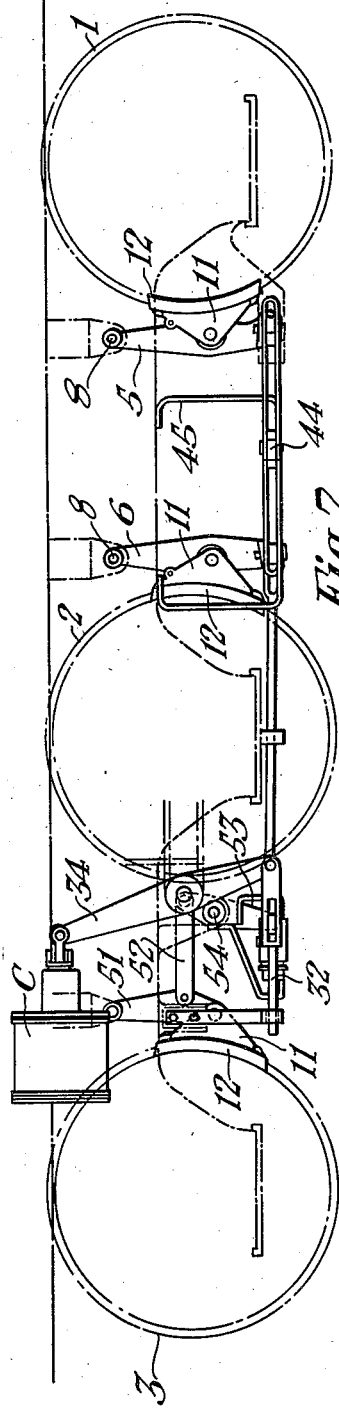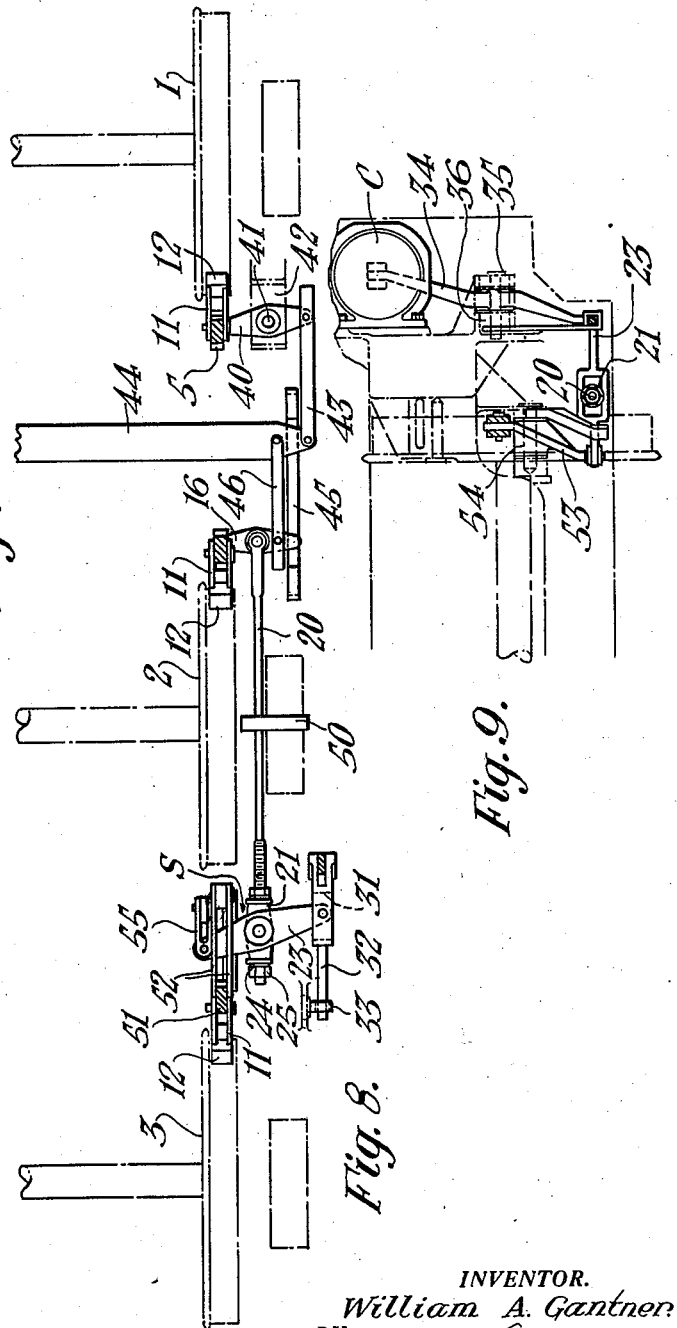

Patented June 18, 1946

2,402,389

UNITED STATES PATENT OFFICE 2,402,389

BRAKE RIGGING

William A. Gantner, Wilkinsburg, Pa., assignor to The American Brake Company, Swissvale, Pa., a corporation of Missouri Application March 24, 1945, Serial No. 584,586

9 Claims. (Cl. 188—46)

My invention relates to brake rigging for railway rolling stock, and particularly to brake rigging for use on a six-wheel motor truck for a Diesel electric locomotive.

One object of my invention is to provide a brake rigging of the type described which can be conveniently mounted on the motor truck within the limited space available.

According to my invention, I provide each wheel with a single brake shoe, and I employ two brake cylinders one for actuating the shoes associated with the three wheels on one side of the truck, and the other for actuating the shoes associated with the wheels on the other side of the truck. The piston rod of each brake cylinder is pivotally connected at one end to a brake cylinder lever which is pivotally mounted intermediate its ends on the truck frame, and the other end of each cylinder lever is connected through a push connector with a main floating equalizing lever. Brake actuating elements connected to this main equalizing lever operate in one direction to apply the brake shoe to the rear wheel of the truck, and in the other direction to apply the brake shoes on the remaining two wheels, per truck side.

Other objects and characteristic features of my invention will become apparent as the description proceeds.

I shall describe three forms of brake rigging embodying my invention, and shall then point out the novel features thereof in claims.

In the accompanying drawings, Fig. 1 is a side elevational view of a Diesel electric locomotive truck provided with one form of brake rigging embodying my invention, Figs. 2 and 3 are top plan, and left-hand end views, respectively, of that portion of the brake rigging embodying my invention which is applied to one-half of the truck, it being understood that the portion which is applied to the other half of the truck is identical with the portion shown. Fig. 4 is a side elevational view of a Diesel electric locomotive truck provided with another form of brake rigging embodying my invention. Figs. 5 and 6 are top plan and left-hand views, respectively, of that portion of the brake rigging shown in Fig. 4 which is applied to one-half of the truck, the brake rigging which is applied to the other half being similar to that shown. Fig. 7 is a side elevational view of a Diesel electric locomotive truck provided with still another form of brake rigging embodying my invention. Figs. 8 and 9 are top plan and left-hand end views, respectively, of that portion of the brake rigging shown in Fig. 7 which is applied to one-half of the truck, the remaining portion being similar to the portion shown.

Similar reference characters refer to similar parts in each of the several views.

Referring first to Figs. 1, 2 and 3, the reference characters 1, 2 and 3 designate respectively the front, middle and rear wheels at one side of a six-wheel motor truck for a Diesel electric locomotive. Only one-half of the truck is shown because the other half is identical to the half which is shown, and it should be pointed out at the outset that in the description which follows the half of the truck which is not shown will be provided with symmetrical brake rigging which is a duplicate of that which I shall now describe.

The brake rigging as shown comprises a hanger lever 5 disposed at the forward side of the front wheel 1, a hanger lever 6 disposed at the forward side of the middle wheel 2, and a hanger lever 7 disposed at the rear side of the rear wheel 3. The hanger levers are pivotally attached at their upper ends to the truck frame by means of pivot pins 8, and each hanger lever is provided at its lower end with spaced jaws 9 which form a recess 10. A brake head 11 is pivotally attached to each hanger lever intermediate its ends, and each brake head carries a brake shoe 12 for engagement with the tread of the associated wheel.

A brake beam 13 is secured adjacent one end within the recess 10 in the hanger lever 5 by means of a pivot pin 14 which extends through registering openings formed in the brake beam and in the jaws 9 of the hanger lever, and the outer end of this brake beam is connected by means of a pull rod 15 disposed at the outer side of the wheel 1 with a transversely extending horizontally disposed floating equalizer lever 16 intermediate its ends. The equalizer lever 16 is slidably supported at its outer end by means of a U-shaped supporting bracket 17 suspended from the truck frame, and is pivotally connected at its inner end to the hanger lever 6 within the jaw 10 by means of a pivot pin 18. Associated with the pull rod 15 intermediate its ends is a rod support 19 which functions in the event that either end of the pull rod 15 should become disconnected for any reason, to prevent the pull rod from dropping onto the ties and thereby damaging the brake rigging.

The equalizer lever 16 is pivotally connected intermediate its point of connection with the hanger lever 6 and its point of connection with the pull rod 15, with one end of a pull rod 20, the opposite end of which is threaded and extends with clearance through a sleeve 21 forming part of a slack adjuster S. The sleeve 21 is pivotally mounted within an opening 22 formed in a main transversely extending horizontally disposed floating equalizer lever 23, and disposed on the threaded end of the pull rod 20 on opposite sides of the sleeve 21 are lock washers 24 and nuts 25. It will be obvious that by adjusting the nuts 25, the effective length of the pull rod 20 may be readily varied to take up slack as the brake shoes become worn. Associated with the pull rod 20 intermediate its ends is a rod support 50 which performs the same general function as the pull rod support 19 associated with the pull rod 15.

The main floating equalizer lever 23 is slidably supported adjacent its inner end on a U-shaped supporting bracket 26 suspended from the truck frame, and is pivotally attached at its inner end to one end of a pull rod 27. The other end of the pull rod 27 is pivotally attached to a brake beam 28 adjacent its end. The brake beam 28 extends transversely of the wheel 3 at the rear side of the wheel, and is pivotally connected at its outer end to the hanger lever 7 within the recess 10 in the hanger lever by means of a pivot pin 29.

The main equalizer lever 23 extends at its outer end into an opening 31 formed in a push connector 32 intermediate its ends, and is pivotally connected to the push connector by means of a pivot pin 30 which extends through the lever and through the sides of the push connector above and below the lever. The push connector 32 extends longitudinally of the truck frame in a horizontal plane, and is slidably supported at one end in a supporting bracket 33 suspended from the truck frame. The other end of the push connector 32 is pivotally attached to the lower end of a vertically disposed brake cylinder lever 34. As best seen in Fig. 3, the brake cylinder lever 34 is pivotally supported intermediate its ends on a pivot pin 35 mounted in a pin support 36 provided on the side of the truck frame, and has its lower end offset inwardly toward the truck frame and its upper end offset outwardly away from the truck frame. The upper end of the brake cylinder lever is operatively connected with the push rod 38 of a brake cylinder C. The brake cylinder C is conveniently mounted on a vertically disposed supporting member 37 provided on the truck frame in front of the rear wheel 3. The brake cylinder is of the usual type, and includes the usual cylinder portion (not shown), return spring (not shown) and push rod 38 operated by the piston.

In operation, when fluid under pressure is supplied to the brake cylinder C, the push rod 38 is forced outwardly in the cylinder, and this outward movement of the push rod 38 acts through the brake cylinder lever 34 and push connector 32 to move the outer end of the main equalizer lever 23 toward the left as viewed in Fig. 2. This movement of the main equalizer lever, in turn, first causes the lever to rotate in a clockwise direction about the sleeve 21 as an axis and thus causes the pull rod 27 and brake beam 28 to move toward the right and rotate the hanger lever 7 toward the wheel 3 to the position in which the brake shoe 12 associated with the wheel 3 engages the wheel. As soon, however, as the brake shoe 12 moves into frictional engagement with the wheel 3, further movement of the pull rod 27 toward the right is prevented and continued movement of the outer end of the main equalizer lever toward the left then causes this equalizer lever to fulcrum about its point of connection with the pull rod 27 and thus move the pull rod 20 toward the left. The movement of the pull rod 20 toward the left, in turn, first acts to rotate the equalizer lever 16 in a manner to move the brake shoe 12 associated with the wheel 2 into frictional contact with this wheel, and then acts to rotate the lever 16 in a clockwise direction about the pivot pin 18 to thus move the pull rod 15 and brake beam 13 toward the left, whereby the brake shoe 12 associated with the wheel 1 is moved into frictional engagement with the wheel 1. The parts are so proportioned that when all of the brake shoes have moved into frictional engagement with the associated wheel, the braking forces exerted by the shoes on the associated wheel will be substantially equal.

To release the brakes, the fluid which was supplied to the brake cylinder C to apply the brakes is vented from the brake cylinder in the usual manner, whereupon the force due to the release spring disposed within the brake cylinder together with the force of gravity acting on the hanger levers act to move the hanger levers, and hence the brake shoes to their released positions.

It should be particularly noted that with the brake rigging constructed in the manner described substantially all parts of the brake rigging with the exception of the pull rod 27 are disposed outboard of the wheels where they will not interfere with any part of the driving mechanism for the wheels. This driving mechanism is not shown, but it will be understood that this driving mechanism comprises an integral part of the motor truck.

Referring now to Figs. 4, 5 and 6, in the modified form of brake rigging here shown the brake hanger lever 5 which supports the brake head 11 and brake shoe 12 associated with the front or leading wheel 1, instead of being located at the forward side of the wheel, as shown in Figs. 1 and 2, is disposed at the rear side of the wheel to minimize any tendency for the truck to tilt when the brakes are applied, particularly when the truck centering or swiveling plate (not shown) is located off center toward the rear of the truck. The hanger lever 5 is pivotally connected at its lower end with one end of an equalizer lever 40 which extends transversely of the truck outboard of the wheels, and which is pivotally supported intermediate its ends on a pivot pin 41 mounted in a support 42 provided on the engine frame. The outer end of the equalizer lever 40 is connected by means of a strap link 43 with the outer end of an intermediate beam 44. The intermediate beam 44 extends transversely of the truck approximately midway between the wheels 2 and 3, and is slidably supported just inside of the point of connection of the strap link 43 with the intermediate beam by means of a supporting bracket 45 suspended from the truck frame. The supporting bracket 45 takes the place of the bracket 17 shown in Figs. 1 and 2, and serves to support the outer end of the equalizer lever 16. The equalizer lever 16 is connected adjacent its outer end with the brake beam 44 by means of a strap link 46. The remainder of the brake rigging shown in Figs. 4, 5 and 6 is identical with the corresponding portion of the brake rigging shown in Figs. 1, 2 and 3.

In operation, when fluid is admitted to the brake cylinder C, the resultant outward movement of the piston rod 38 first causes the brake shoes 12 associated with the wheels 3 and 2 to move into engagement with these wheels in the manner previously described in connection with Figs. 1 and 2, after which the equalizer lever 16 is caused to rotate in a clockwise direction about its point of connection with the hanger lever 6. This latter rotation acts through the link 46, brake beam 44, and link 43 to rotate the equalizer lever 40 in a clockwise direction, and hence causes the lower end of the hanger lever 5 to move toward the wheel 1 to thereby force the brake shoe 12 associated with this wheel into engagement with the wheel.

Upon exhaust of fluid from the brake cylinder, the force exerted by the release spring in the cylinder combined with the force of gravity acting on the hanger levers will cause the brakes to return to their released positions.

Referring now to Figs. 7, 8 and 9, as here shown, the brake head 11 which carries the brake shoe 12 associated with the rear wheel 3 of the truck is pivotally attached to the lower end of a hanger lever 51 disposed at the forward side of the wheel. The hanger lever 51 is pivotally attached at its upper end to the truck frame in the same manner that the other hanger levers 5, 6 and 7 are attached to the truck frame in the preceding views, and is operatively connected intermediate its ends through the medium of a pair of strap links 52 with the upper end of a vertically disposed transmitting lever 53. The transmitting lever 53, in turn, is pivotally supported intermediate its ends on a pivot pin 54 mounted in a suitable pin support provided on the side of the truck frame, and is connected at its lower end by means of a double jaw 55 with the inner end of the equalizer 23. The remainder of the brake rigging is identical with that previously described in connection with Figs. 4, 5 and 6.

The operation of the brake rigging shown in Figs. 7, 8 and 9 will be apparent from an inspection of the drawings without further detailed description.

One advantage of the brake rigging shown in Figs. 7, 8 and 9 is that it further minimizes any tendency for the truck to tilt when the brakes are applied.

Although I have herein shown and described only three forms of brake rigging embodying my invention, it is understood that various changes and modifications may be made therein within the scope of the appended claims without departing from the spirit and scope of my invention.

Having thus described my invention, what I claim is:

1. In a brake rigging in combination, a push connector slidably supported at one end and pivotally connected at the other end to a lever for at times actuating said push connector, said push connector being provided intermediate its ends with an opening, an equalizer lever pivotally attached at one end to said push connector within said opening and supported at said one end by said push connector, said equalizer lever being slidably supported adjacent its other end by a supporting surface, and brake applying means connected with said lever to be actuated in opposite directions in response to actuation of said lever by said push connector.

2. In a brake rigging in combination, an equalizer lever pivotally connected at one end to a push connector which supports one end of said equalizer lever and slidably supported adjacent its other end by a supporting bracket and provided intermediate its ends with an opening, a trunnion forming part of a slack adjuster pivotally supported in said opening, a first pull rod provided with a threaded end extending with clearance through said sleeve, nuts screwed onto said threaded end of said pull rod on opposite sides of said sleeve, a second pull rod connected to said other end of said equalizer lever, and brake elements connected with said pull rods.

3. A brake rigging for a six wheel truck comprising at each side of the truck a brake cylinder secured to the truck frame, a brake cylinder lever pivotally attached intermediate its ends to the truck frame and operatively connected at its upper end with the brake cylinder, a push connector slidably supported at one end and pivotally connected at the other end with the lower end of said brake cylinder lever, an equalizer lever pivotally attached at one end to said push connector intermediate its ends and slidably supported adjacent the other end, a first pull rod pivotally connected at one end to said other end of said equalizer lever and operatively connected at the other end with a brake element for the one rear wheel of the truck, and a second pull rod connected at one end with said equalizer lever intermediate its ends and operatively connected at the other end with brake elements for the other two wheels on the same side of the truck.

4. A brake rigging for a six wheel truck comprising at each side of the truck a brake cylinder secured to the truck frame, a brake cylinder lever pivotally attached intermediate its ends to the truck frame and operatively connected at its upper end with the brake cylinder, a push connector slidably supported at one end and pivotally connected at the other end with the lower end of said brake cylinder lever, an equalizer lever pivotally attached at one end to said push connector intermediate its ends and slidably supported adjacent the other end, a first pull rod pivotally connected at one end to said other end of said equalizer lever and operatively connected at the other end with a brake element for the one rear wheel of the truck, a second pull rod connected at one end with said equalizer lever intermediate its ends and connected at the other end with a second equalizer lever intermediate its ends, a second brake element for the one middle wheel of the truck connected to one end of said second equalizer lever, and a third pull rod connected at one end to the other end of said second equalizer lever and at the other end to a brake element for the one front wheel of the truck.

5. A brake rigging for a six wheel truck comprising at each side of the truck a brake cylinder secured to the truck frame, a brake cylinder lever pivotally attached intermediate its ends to the truck frame and operatively connected at its upper end with the brake cylinder, a push connector slidably supported at one end and pivotally connected at the other end with the lower end of said brake cylinder lever, an equalizer lever pivotally attached at one end to said push rod and slidably supported adjacent the other end, a first pull rod pivotally connected at one end to said other end of said equalizer lever and operatively connected at the other end with a brake element for the one rear wheel of the truck, and a second pull rod connected at one end with said equalizer lever intermediate its ends by means of a slack adjuster and operatively connected at the other end with brake elements for the other two wheels on the same side of the truck.

6. A brake rigging for a six wheel truck comprising at each side of the truck a brake cylinder secured to the truck frame, a brake cylinder lever pivotally attached intermediate its ends to the truck frame and operatively connected at its upper end with the brake cylinder, a push connector slidably supported at one end and pivotally connected at the other end with the lower end of said brake cylinder lever, an equalizer lever pivotally attached at one end to said push connector and slidably supported adjacent the other end, a first pull rod pivotally connected at one end to said other end of said equalizer lever and operatively connected at the other end with a brake element for the one rear wheel of the truck, a second pull rod connected at one end with said equalizer lever and connected at the other end with a second equalizer lever intermediate its ends, a second brake element for the one middle wheel of the truck connected to one end of said second equalizer lever, and a third pull rod connected at one end to the other end of said second equalizer lever and at the other end to a brake element for the one front wheel of the truck, all parts of said brake rigging except said first mentioned pull rod being disposed outboard of the truck.

7. A brake rigging for a six wheel truck comprising at each side of the truck a brake cylinder secured to the truck frame, a brake cylinder lever pivotally attached intermediate its ends to the truck frame and operatively connected at its upper end with the brake cylinder, a push connector slidably supported at one end and pivotally connected at the other end with the lower end of said brake cylinder lever, a main equalizer lever pivotally attached at one end to said push connector and slidably supported adjacent the other end, a first pull rod pivotally connected at one end to said other end of said main equalizer lever and operatively connected at the other end with a brake element for the one rear wheel of the truck, a second pull rod connected at one end with said main equalizer lever intermediate its ends and operatively connected at the other end with a second equalizer lever intermediate its ends, a brake element for the middle wheel of the truck operatively connected with the one end of said second equalizer lever, an intermediate beam extending transversely of the truck between the front and middle wheel of the truck and connected adjacent one end with the other end of said second equalizer lever, and a fourth lever pivotally supported intermediate its ends and operatively connected at one end with said one end of said intermediate beam and at the other end with a brake element disposed at the rear side of the one front wheel of the truck.

8. A brake rigging for a six wheel truck comprising at each side of the truck a brake cylinder secured to the truck frame, a brake cylinder lever pivotally attached intermediate its ends to the truck frame and operatively connected at its upper end with the brake cylinder, a push connector slidably supported at one end and pivotally connected at the other end with the lower end of said brake cylinder lever, a main equalizer lever pivotally attached at one end to said push connector and slidably supported adjacent the other end, a vertical lever pivotally attached intermediate its ends to the truck frame and operatively connected at its lower end to the other end of said main equalizer lever and at its upper end to a hanger lever carrying a brake element disposed at the forward side of the one rear wheel of the truck for applying a brake to such one rear wheel, and means connected with said main equalizer lever intermediate its ends for operating brake elements for the one middle and one front wheel of the truck.

9. A brake rigging for a six wheel truck comprising at each side of the truck a brake cylinder secured to the truck frame, a brake cylinder lever pivotally attached intermediate its ends to the truck frame and operatively connected at its upper end with the brake cylinder, a push connector slidably supported at one end and pivotally connected at the other end with the lower end of said brake cylinder lever, a main equalizer lever pivotally attached at one end to said push connector and slidably supported adjacent the other end, a vertical lever pivotally attached intermediate its ends to the truck frame and operatively connected at its lower end to the other end of said main equalizer lever and at its upper end to a hanger lever carrying a brake element disposed at the forward side of the one rear wheel of the truck for applying a brake to such one rear wheel, a pull rod connected at one end with said main equalizer lever intermediate its ends and operatively connected at the other end with a second equalizer lever intermediate its ends, a brake element for the middle wheel of the truck operatively connected with the one end of said second equalizer lever, an intermediate beam extending transversely of the truck between the front and middle wheel of the truck and connected adjacent one end with the other end of said second equalizer lever, and a fourth lever pivotally supported intermediate its ends and operatively connected at one end with said one end of said intermediate beam and at the other end with a brake element disposed at the rear side of the one front wheel of the truck.

WILLIAM A. GANTNER.